(12) United States Patent
Kim

(10) Patent No.: US 8,584,447 B2
(45) Date of Patent: Nov. 19, 2013

(54) FILTER DEVICE FOR FILTERING AUTOMOBILE EXHAUST GAS

(75) Inventor: Hyun Tae Kim, Seoul (KR)

(73) Assignee: Alantum Corporation, Seongnam (KR)

( * ) Notice: Subject to any disclaimer, the term of this patent is extended or adjusted under 35 U.S.C. 154(b) by 334 days.

(21) Appl. No.: 13/003,783

(22) PCT Filed: Jul. 18, 2008

(86) PCT No.: PCT/KR2008/004226
§ 371 (c)(1),
(2), (4) Date: Jan. 12, 2011

(87) PCT Pub. No.: WO2010/008110
PCT Pub. Date: Jan. 21, 2010

(65) Prior Publication Data
US 2011/0113755 A1    May 19, 2011

(51) Int. Cl.
*F01N 3/10* (2006.01)
(52) U.S. Cl.
USPC .................. 60/301; 60/275; 60/311
(58) Field of Classification Search
USPC ................. 60/275, 311; 422/177
See application file for complete search history.

(56) References Cited

U.S. PATENT DOCUMENTS

| | | | |
|---|---|---|---|
| 4,969,328 A * | 11/1990 | Kammel | 60/275 |
| 5,606,854 A * | 3/1997 | Hoffmann | 60/274 |
| 6,085,394 A * | 7/2000 | Hartman | 24/16 PB |
| 6,725,654 B2 * | 4/2004 | Li | 60/299 |
| 7,935,163 B2 * | 5/2011 | Samaras et al. | 55/385.3 |
| 2003/0185723 A1 * | 10/2003 | Anji et al. | 422/179 |
| 2005/0047982 A1 * | 3/2005 | Berriman et al. | 423/235 |
| 2006/0029527 A1 * | 2/2006 | Pellegrino et al. | 422/177 |

FOREIGN PATENT DOCUMENTS

| | | |
|---|---|---|
| KR | 10-2007-0000043 | 1/2007 |
| KR | 10-0788405 | 1/2008 |
| KR | 10-0804142 | 2/2008 |
| KR | 10-0822450 | 4/2008 |

OTHER PUBLICATIONS

Machine Translation from the Korean Intellectual Property Office of KR 10-0788405, Filter apparatus of distributed flow for efficiency improvement of the metal foam filter for vehicle, Jan. 2, 2008.*

* cited by examiner

*Primary Examiner* — Thomas Denion
*Assistant Examiner* — Jason Shanske
(74) *Attorney, Agent, or Firm* — Lexyoume IP Meister, PLLC.

(57) ABSTRACT

A filter device for filtering automobile exhaust gas includes a case, front and rear support flanges mounted inside the case, and the filter member mounted between the front and rear support flanges. The front and rear support flanges are fixed vertically to the front and rear end portions of the filter member, respectively. The filter member includes a laminated or rolled-up metallic foam filter and a metallic mat or a jacket wrapping around the metallic foam filter. The porous pipe mounted inside the filter member is formed with a plurality of holes. The porous pipe is structured such that the width thereof decreases gradually towards the rear end portion or increase gradually towards the rear end portion, or the holes in the rear end portion are smaller, or a conical member is inserted in the inside space, or a pyramidal member is inserted in the inside space.

15 Claims, 10 Drawing Sheets

→ flow of exhaust gas

FILTER DEVICE FOR FILTERING AUTOMOBILE EXHAUST GAS

TECHNICAL FIELD

The present invention relates to a filter device for filtering automobile exhaust gas, in which a conical or pyramidal member is mounted inside a porous pipe through which the exhaust gas flows, thereby improving the flow of the exhaust gas and not creating a gradient in the flow rate to enable to uniformly collect particulate matter inside the porous pipe. The invention relates to a filter device for filtering automobile exhaust gas, in which a metallic foam filter mounted inside the filter member is wrapped around with a metallic mat to enable to preserve the original shape of the metallic foam filter to thereby improve the durability of the filter device. The invention relates to a filter device for filtering automobile exhaust gas, in which the filter member is divided into a plurality of filter regions by means of a partition, each of which is treated with various catalysts and then mounted inside a single filter member to thereby remove various gases from the exhaust gas, and the metallic foam has various catalysts to enable to produce a variety of post-treatment devices for exhaust gas including DOC, DeNOx, DPF, SCR, LNT, Soot Capacitor, a catalyst filter of EGR, an evaporator and an electrostatic filter. The invention relates to a filter device for filtering automobile exhaust gas, in which a support distribution member is disposed in the front portion of the conical member mounted inside the porous pipe, thereby allowing the exhaust gas to flow into the porous pipe with a uniform flow rate. The invention relates to a filter device for filtering automobile exhaust gas, in which the porous pipe is structured such that the width thereof decreases gradually towards the rear end portion, or increase gradually towards the rear end portion, thereby allowing particulate matter to be uniformly collected inside the porous pipe. The invention relates to a filter device for filtering automobile exhaust gas, in which the porous pipe is formed such that the holes in the rear end portion are smaller to cause a uniform flow rate even when the flow rate in the rear end portion becomes high by a high pressure due to a smaller flow area. The invention relates to a filter device for filtering automobile exhaust gas, in which a conical lid is fastened to the upper end portion of the filter assembly so that the exhaust gas entering the inlet port can flow smoothly. The invention relates to a filter device for filtering automobile exhaust gas, in which a sealing mat is disposed between the front support flange and the metallic foam filter and between the rear support flange and the metallic foam filter, and the sealing mat is formed of a metallic wire mesh having a thermal expansion coefficient similar to that of the metallic foam, thereby enabling application of a welding process, effectively preventing leakage of the exhaust gas due to a long term service of the fume reduction device, i.e., DPF (Diesel Particulate Filter) to improve the performance of the filter device, and maintaining the flow passage for a long period of time due to the high durability thereof. The invention relates to a filter device for filtering automobile exhaust gas, in which a turbulence generator member is mounted into the inside of the porous pipe having a polygonal air passageway to create a turbulence in the exhaust gas and thus obtain a uniform flow distribution, and simultaneously to decrease the flow rate of the exhaust gas and increase the stagnant time of the exhaust gas inside the filter, thereby increasing the probability of contacting the metallic foam filter with particulate matter to increase the efficiency of collection thereof. The invention relates to a filter device for filtering automobile exhaust gas, in which a metallic fastener device is used for fastening a rolled-up type metallic foam filter to thereby provide easy fastening of the filter assembly, minimize deformation of the metallic foam, and reduce loss of the metallic foam when the metallic foam filter is rolled up. The invention relates to a filter device for filtering automobile exhaust gas, in which a similar or dissimilar metallic foam filters are connected by sewing in one or more forms among a repeated spiral form, a sinuous waveform, a rectangular waveform, a circular form, a semi-circular form, and a X-letter form, thereby allowing the user to connect plural metallic foams in a variety of shapes, depending upon applications thereof.

BACKGROUND ART

In case of a conventional radial metallic foam filter, if the exhaust gas is flown in towards the inner pipe, a high pressure is exerted on the blocked rear end portion of the inner pipe to increase the flow rate at the rear end portion, and a low pressure is exerted on the front end portion of the inner pipe to decrease the flow rate at the front end portion. In this way, where the flow rate becomes different throughout the filter, a large amount of particulate matters are collected at the rear end portion of high flow rate and a less amount of particulate matters are collected in the front end portion for the same period of time because of the lower flow rate. In this case, if a reproduction occurs, the filter can be damaged or distorted due to the temperature gradient. In addition, it causes an increase in the back pressure before the reproduction occurs to adversely affect the performance of the filter.

Conventionally, the sealing material for fume reduction devices has employed a ceramic seal. The ceramic seal is inherently easily deformed and provides excellent machining characteristics. However, when the ceramic seal is used in a fume reduction device, repeated heating and cooling, and the thermal impact degrade the durability thereof.

Further, a high-temperature exhaust gas flows into a fume reduction device and is discharged to the outside via a filter. During this course of action, the high-temperature of the exhaust gas is transferred to each part of the fume reduction device. In addition, the conventional sealing mat is destroyed or burned out due to the periodic heating and cooling and the thermal shock.

In addition, the porous tube is limited to the convenience in the manufacturing of a metallic foam and functions to maintain the shape thereof. Thus, the flow rate of the exhaust gas cannot be reduced and the stagnant time inside the filter cannot be increased. In addition, the probability of contacting particulate matters with the metallic foam filter cannot be increased so that the efficiency of collection cannot be improved.

Further, in the conventional manufacturing of a filter assembly, it is manufactured in a rolled-up type or a laminated type so that the metallic foam is deformed and lost during the laminating or rolling-up process, thereby degrading the assembling property of the filter assembly.

Conventionally, an adhesive has been used to connect the metallic foams. However, when an adhesive is employed, it should be removed by heating up to about 600° C. for the function of the foam. When heating to such a high temperature, a high-speed heating is required not to damage the metallic foam, but it is not possible by conventional techniques. Therefore, the longer processing time is required. The highly heated adhesive is not completely burned out and partly left as ashes, which may block holes in the metallic form, thereby degrading the function of the metallic foam. Furthermore, when the metallic foam is rolled up after connecting using an adhesive, the connection of metallic foams may be destroyed during the rolling-up process, due to the high tensile strength of the connection portions.

DISCLOSURE OF INVENTION

Technical Problem

Accordingly, the present invention has been made to solve the above-mentioned problems occurring in the conventional art, and a primary object of the present invention is to provide a filter device for filtering automobile exhaust gas, in which a conical or pyramidal member is mounted inside a porous pipe through which the exhaust gas flows, thereby improving the flow of the exhaust gas and not creating a gradient in the flow rate to enable to uniformly collect particulate matter inside the porous pipe.

Another object of the invention is to provide a filter device for filtering automobile exhaust gas, in which a metallic foam filter mounted inside the filter member is wrapped around with a metallic mat to enable to preserve the original shape of the metallic foam filter to thereby improve the durability of the filter device.

Yet another object of the invention is to provide a filter device for filtering automobile exhaust gas, in which the filter member is divided into a plurality of filter regions by means of a partition, each of which is treated with various catalysts and then mounted inside a single filter member to thereby remove various gases from the exhaust gas, and the metallic foam has various catalysts to enable to produce a variety of post-treatment devices for exhaust gas including DOC, DeNOx, DPF, SCR, LNT, Soot Capacitor, a catalyst filter of EGR, an evaporator and an electrostatic filter.

Still another object of the invention is to provide a filter device for filtering automobile exhaust gas, in which a support distribution member is disposed in the front portion of the conical member mounted inside the porous pipe, thereby allowing the exhaust gas to flow into the porous pipe with a uniform flow rate.

A further object of the invention is to provide a filter device for filtering automobile exhaust gas, in which the porous pipe is structured such that the width thereof decreases gradually towards the rear end portion, or increase gradually towards the rear end portion, thereby allowing particulate matter to be uniformly collected inside the porous pipe.

A still further object of the invention is to provide a filter device for filtering automobile exhaust gas, in which the porous pipe is formed such that the holes in the rear end portion are smaller to cause a uniform flow rate even when the flow rate in the rear end portion becomes high by a high pressure due to a smaller flow area.

A yet further object of the invention is to provide a filter device for filtering automobile exhaust gas, in which a conical lid is fastened to the upper end portion of the filter assembly so that the exhaust gas entering the inlet port can flow smoothly.

A further object of the invention is to provide a filter device for filtering automobile exhaust gas, in which a sealing mat is disposed between the front support flange and the metallic foam filter and between the rear support flange and the metallic foam filter, and the sealing mat is formed of a metallic wire mesh having a thermal expansion coefficient similar to that of the metallic foam, thereby enabling application of a welding process, effectively preventing leakage of the exhaust gas due to a long term service of the fume reduction device, i.e., DPF (Diesel Particulate Filter) to improve the performance of the filter device, and maintaining the flow passage for a long period of time due to the high durability thereof.

A further object of the invention is to provide a filter device for filtering automobile exhaust gas, in which a turbulence generator member is mounted into the inside of the porous pipe having a polygonal air passageway to create a turbulence in the exhaust gas and thus obtain a uniform flow distribution, and simultaneously to decrease the flow rate of the exhaust gas and increase the stagnant time of the exhaust gas inside the filter, thereby increasing the probability of contacting the metallic foam filter with particulate matter to increase the efficiency of collection thereof.

A further object of the invention is to provide a filter device for filtering automobile exhaust gas, in which a metallic fastener device is used for fastening a rolled-up type metallic foam filter to thereby provide easy fastening of the filter assembly, minimize deformation of the metallic foam, and reduce loss of the metallic foam when the metallic foam filter is rolled up.

A further object of the invention is to provide a filter device for filtering automobile exhaust gas, in which a similar or dissimilar metallic foam filters are connected by sewing in one or more forms among a repeated spiral form, a sinuous waveform, a rectangular waveform, a circular form, a semi-circular form, and a X-letter form, thereby allowing the user to connect plural metallic foams in a variety of shapes, depending upon applications thereof.

Technical Solution

To accomplish the above object of the present invention, according to one aspect of the invention, there is provided a filter device for filtering automobile exhaust gas. The filter device comprises: A case including an inlet port through which an exhaust gas combusted in an engine flows into a porous pipe and an exhaust port through which the exhaust gas is discharged after passing through the porous pipe and a filter member; a front support flange mounted inside the case, the front support flange being fixed vertically to the front end portion of the filter member wrapping around the porous pipe, thereby holding the porous pipe in place and preventing the filter member from being pushed towards the front end; a rear support flange mounted inside the case, the rear support flange being fixedly fastened vertically to the rear end portion of the filter member wrapping around the porous pipe, thereby holding the porous pipe in place and preventing the filter member from being pushed towards the rear end; and the filter member mounted between the front support flange and the rear support flange, the filter member including a metallic foam filter of a laminated type or rolled-up type through which the exhaust gas flown into the porous pipe passes, and a metallic mat or a jacket wrapping around the metallic foam filter, the metallic foam filter being formed in the form of a network to preserve the original shape of the metallic foam filter and to provide durability thereto, wherein the porous pipe mounted inside the filter member is formed with a plurality of holes through which the exhaust gas can smoothly flow into the filter member and be discharged, the porous pipe being structured such that the width thereof decreases gradually towards the rear end portion or increase gradually towards the rear end portion, or such that the holes in the rear end portion are smaller to cause a uniform flow rate even when the flow rate in the rear end portion becomes high by a high pressure due to a smaller flow area, or such that a conical member is inserted in the inside space where the holes are formed, thereby enabling to uniformly collect particulate matters inside the pipe, or such that a pyramidal member is inserted in the inside space where the holes are formed, thereby enabling to uniformly collect the particulate matters inside the pipe, so that a gradient in the flow rate inside the porous pipe does not occur.

In an embodiment, the filter device further comprises a support distribution member disposed in the front portion of the conical member mounted inside the porous pipe, thereby allowing the exhaust gas to flow into the porous pipe with a uniform flow rate.

In an embodiment, wherein the front support flange is not formed with a vent hole, and the rear support flange is formed with a plurality of vent holes through which the exhaust gas passing through the filter member can be discharged.

In an embodiment, the filter device further comprises a partition inserted into the rear end portion of the conical member mounted internally in the middle of the porous pipe, or a partition inserted into an intermediate portion formed facing the back of the pyramidal member.

In an embodiment, wherein the filter member is divided into a plurality of filter regions by means of a partition, each of which is treated with various catalysts and then mounted inside a single filter member to thereby remove various gases from the exhaust gas, and the metallic foam has various catalysts to enable to produce a variety of post-treatment devices for exhaust gas including DOC, DeNOx, DPF, SCR, LNT, Soot Capacitor, a catalyst filter of EGR, an evaporator and an electrostatic filter.

In an embodiment, a conical lid is fastened to the upper end portion of the filter assembly so that the exhaust gas entering the inlet port can flow smoothly.

In an embodiment, the filter device further comprises a sealing mat disposed between the front support flange and the metallic foam filter and between the rear support flange and the metallic foam filter, the sealing mat being formed of a metallic wire mesh having a thermal expansion coefficient similar to that of the metallic foam.

In an embodiment, the filter device further comprises a turbulence generator member inserted into the inside of the porous pipe and fixed thereto to cause turbulence in the exhaust gas flow and thus decrease the flow rate of the exhaust gas, thereby increasing the stagnant time of the exhaust gas inside the filter.

In an embodiment, wherein the turbulence generator member is formed in the form of a plate-like thin layer and integrally and vertically fixed to the porous pipe, so that the exhaust gas being flown into the porous pipe is collided to the plate-like thin layer of the turbulence generator member to generate a turbulent current, thereby enabling to slow down the speed of the exhaust gas and thus increase the period of time for which the exhaust gas remains inside the filter.

In an embodiment, the filter device further comprises a metallic fastener guide wrapping around the metallic foam filter to thereby provide easy fastening of the filter assembly when the metallic foam filter is rolled up, and a metallic fastener device holding the metallic fastener guide to thereby minimize deformation of the metallic foam and reduce loss of the metallic foam.

In an embodiment, wherein the metallic fastener device includes a single or plural metallic fastener devices, the metallic fastener device is formed to have plural point-tipped portions, and the size of the point-tipped portion 92 varies with characteristic of the foam.

In an embodiment, wherein the similar or dissimilar metallic foam filters are connected by sewing in one or more forms among a repeated spiral form, a sinuous waveform, a rectangular waveform, a circular form, a semi-circular form, and a X-letter form.

Advantageous Effects

As described above, according to the present invention, a conical or pyramidal member is mounted inside a porous pipe through which the exhaust gas flows, thereby improving the flow of the exhaust gas and not creating a gradient in the flow rate to enable to uniformly collect particulate matter inside the porous pipe. A metallic foam filter mounted inside the filter member is wrapped around with a metallic mat to enable to preserve the original shape of the metallic foam filter to thereby improve the durability of the filter device. The filter member is divided into a plurality of filter regions by means of a partition, each of which is treated with various catalysts and then mounted inside a single filter member to thereby remove various gases from the exhaust gas, and the metallic foam has various catalysts to enable to produce a variety of post-treatment devices for exhaust gas including DOC, DeNOx, DPF, SCR, LNT, Soot Capacitor, a catalyst filter of EGR, an evaporator and an electrostatic filter. A support distribution member is disposed in the front portion of the conical member mounted inside the porous pipe, thereby allowing the exhaust gas to flow into the porous pipe with a uniform flow rate. The porous pipe is structured such that the width thereof decreases gradually towards the rear end portion, or increase gradually towards the rear end portion, thereby allowing particulate matter to be uniformly collected inside the porous pipe. The porous pipe is formed such that the holes in the rear end portion are smaller to cause a uniform flow rate even when the flow rate in the rear end portion becomes high by a high pressure due to a smaller flow area. A conical lid is fastened to the upper end portion of the filter assembly so that the exhaust gas entering the inlet port can flow smoothly. A sealing mat is disposed between the front support flange and the metallic foam filter and between the rear support flange and the metallic foam filter, and the sealing mat is formed of a metallic wire mesh having a thermal expansion coefficient similar to that of the metallic foam, thereby enabling application of a welding process, effectively preventing leakage of the exhaust gas due to a long term service of the fume reduction device, i.e., DPF (Diesel Particulate Filter) to improve the performance of the filter device, and maintaining the flow passage for a long period of time due to the high durability thereof. A turbulence generator member is mounted into the inside of the porous pipe having a polygonal air passageway to create a turbulence in the exhaust gas and thus obtain a uniform flow distribution, and simultaneously to decrease the flow rate of the exhaust gas and increase the stagnant time of the exhaust gas inside the filter, thereby increasing the probability of contacting the metallic foam filter with particulate matter to increase the efficiency of collection thereof. A metallic fastener device is used for fastening a rolled-up type metallic foam filter to thereby provide easy fastening of the filter assembly, minimize deformation of the metallic foam, and reduce loss of the metallic foam when the metallic foam filter is rolled up. A similar or dissimilar metallic foam filters are connected by sewing in one or more forms among a repeated spiral form, a sinuous waveform, a rectangular waveform, a circular form, a semi-circular form, and a X-letter form, thereby allowing the user to connect plural metallic foams in a variety of shapes, depending upon applications thereof.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Hereinafter, a preferred embodiment of the invention will be explained in detail with reference to the accompanying drawings. In the explanation of embodiments, details well-known in the art and not related directly to the invention may be omitted to avoid unnecessarily obscuring the invention and convey the gist of the invention more clearly. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. Thus, such a special definition will be expressly set forth in the specification in a definitional manner that directly and unequivocally provides the special definition for the term or phrase.

Figure 1:
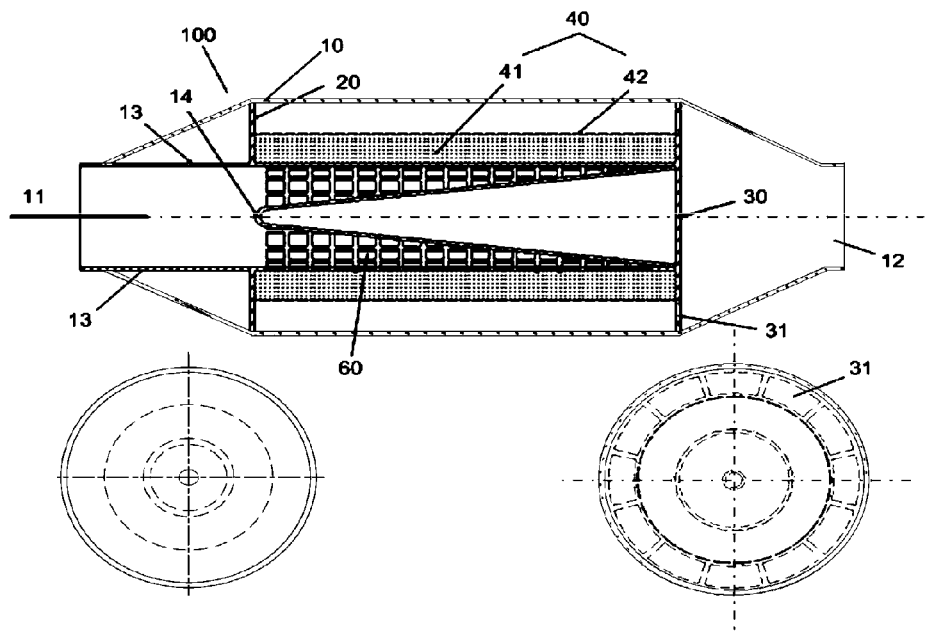
FIG. 1 is a sectional view illustrating a filter device according to an embodiment of the invention where a conical member is mounted in an internal pipe.
Figure 2:
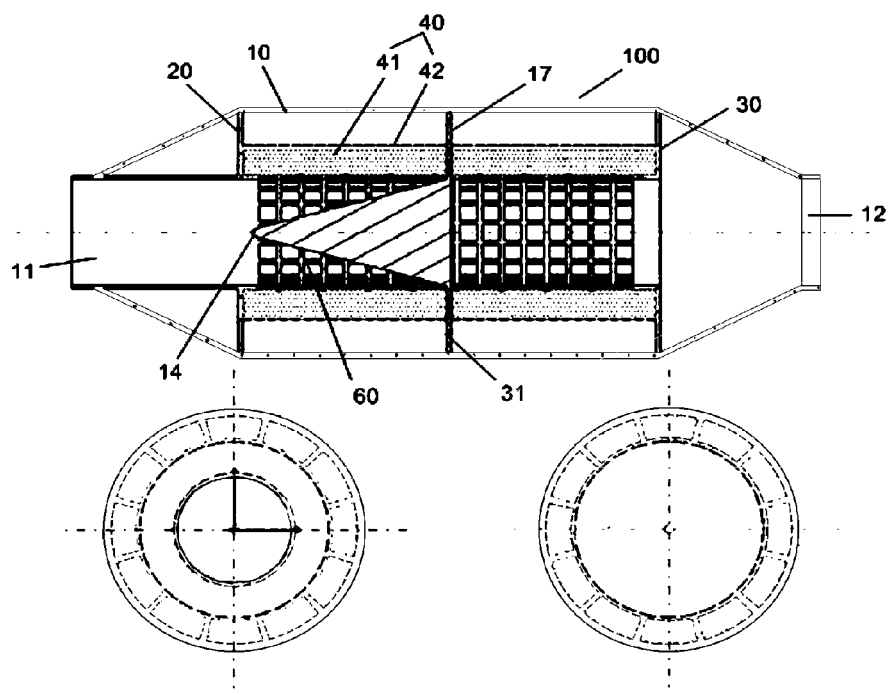
FIG. 2 is a sectional view illustrating a filter device according to an embodiment of the invention where a partition is mounted in the rear end portion of the conical member of the internal pipe.
Figure 3:
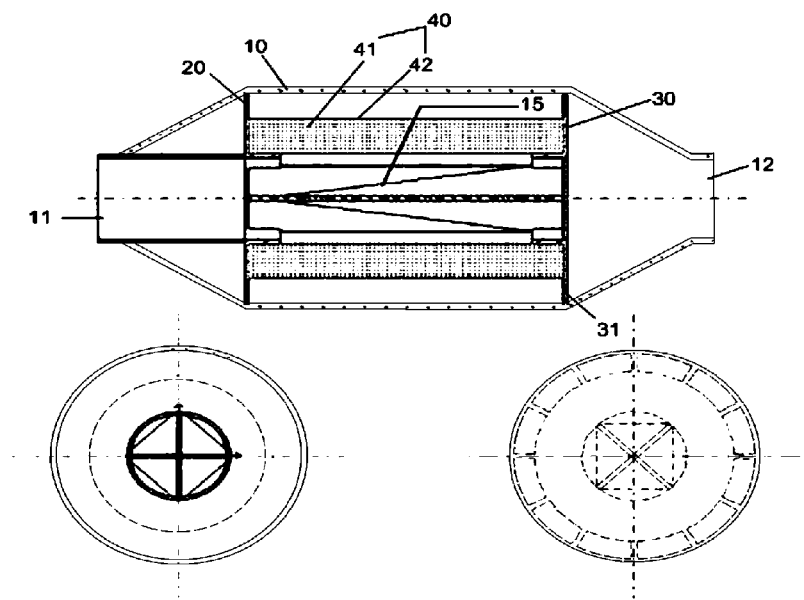
FIG. 3 is a sectional view illustrating a filter device according to the invention where a pyramidal member is mounted in the internal pipe.
Figure 4:
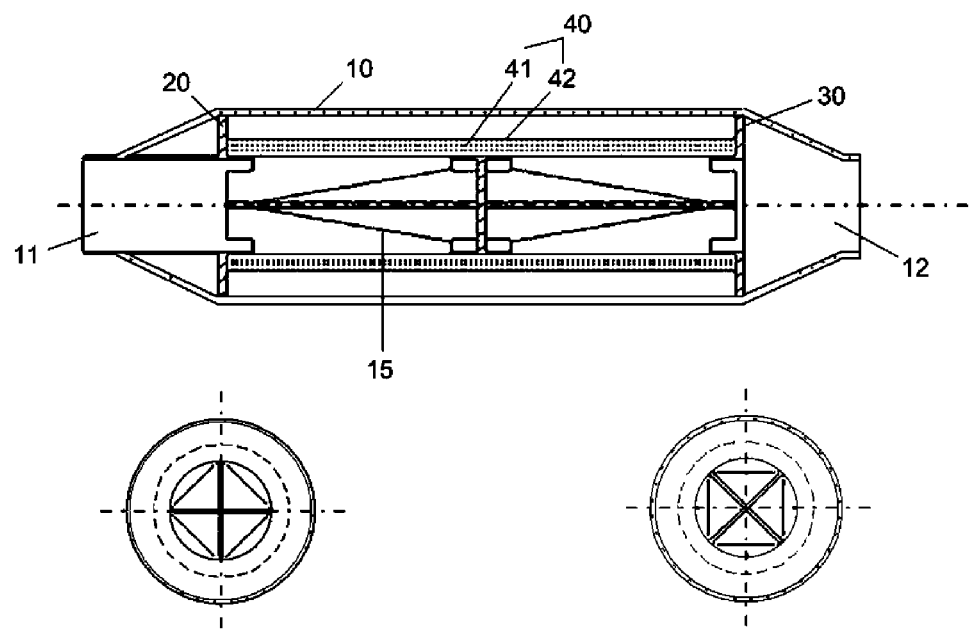
FIG. 4 is a sectional view illustrating a filter device according to an embodiment of the invention where a partition is mounted in the middle portion of pyramidal members facing each other in the internal pipe.
Figure 5:
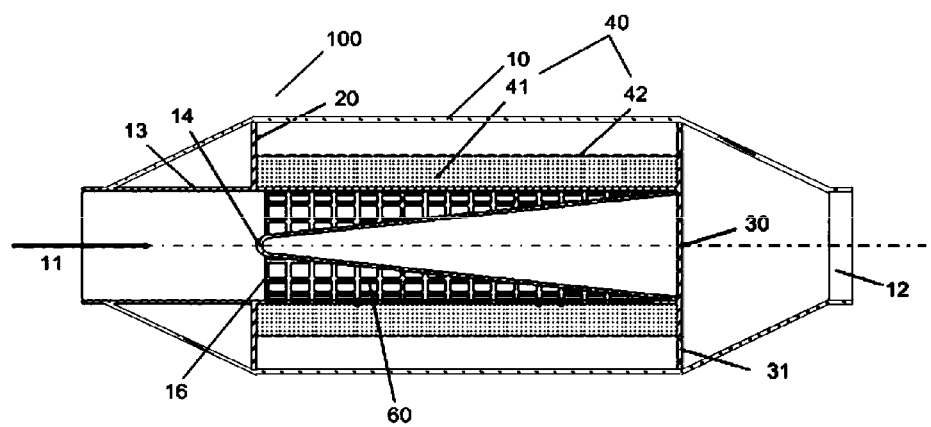
FIG. 5 is a sectional view illustrating a filter device according to an embodiment of the invention where a support distribution member is formed in the front end portion of the conical member.
Figure 6:
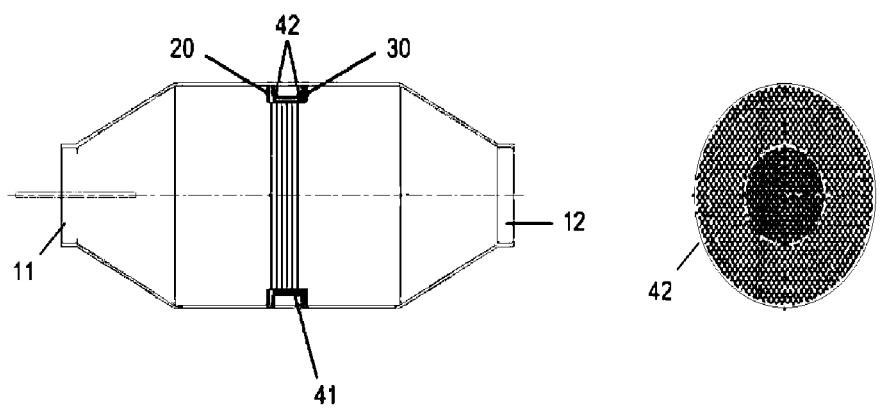
FIG. 6 is a sectional view illustrating a filter device according to an embodiment of the invention where a metallic mat is mounted.
Figure 7:
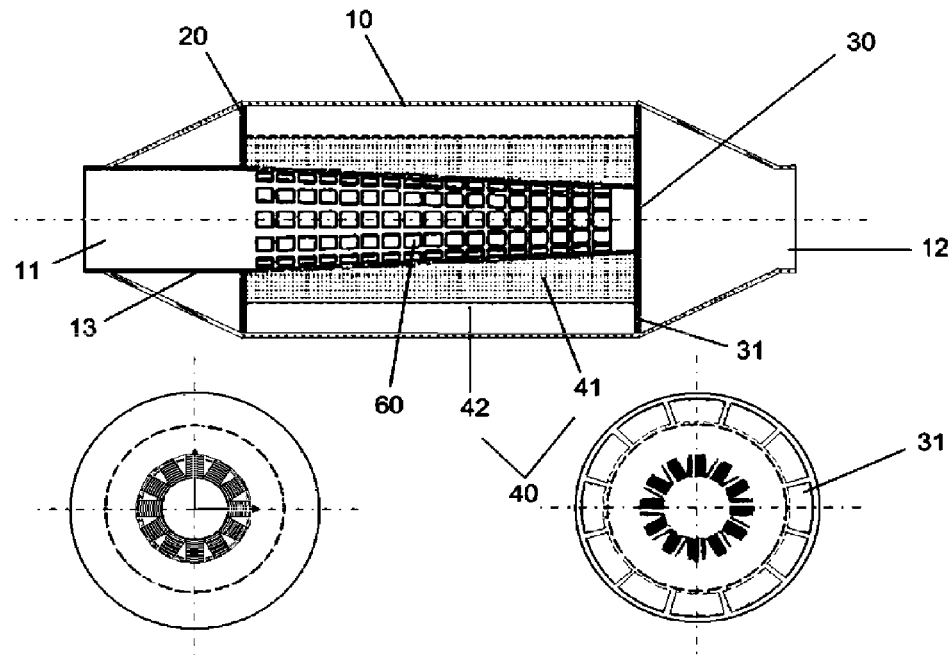
FIG. 7 is a sectional view illustrating a filter device according to an embodiment of the invention where the internal pipe is structured in a shrinking-type.
Figure 8:
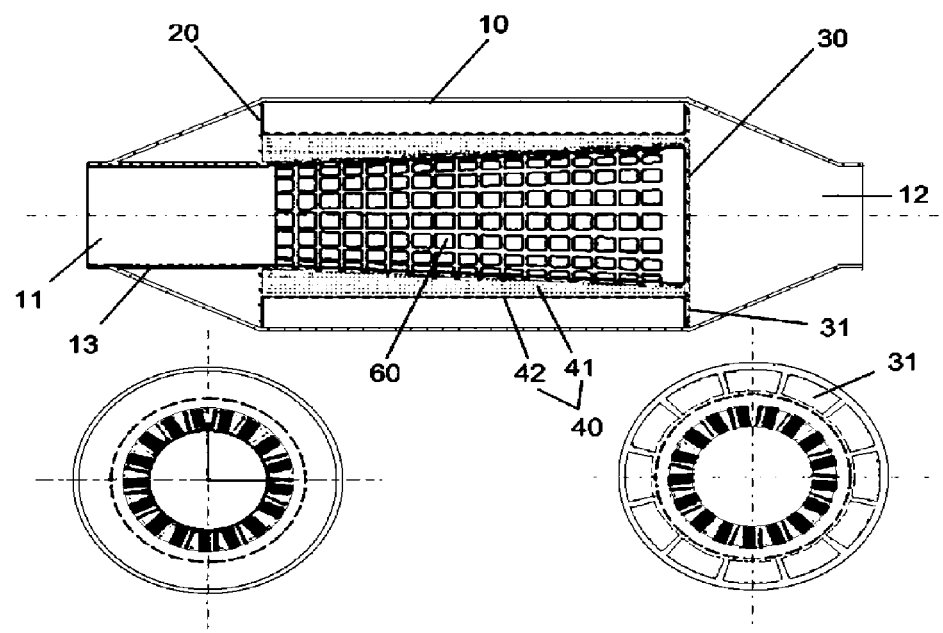
FIG. 8 is a sectional view illustrating a filter device according to an embodiment of the invention where the internal pipe is structured in an enlarging-type.
Figure 9:
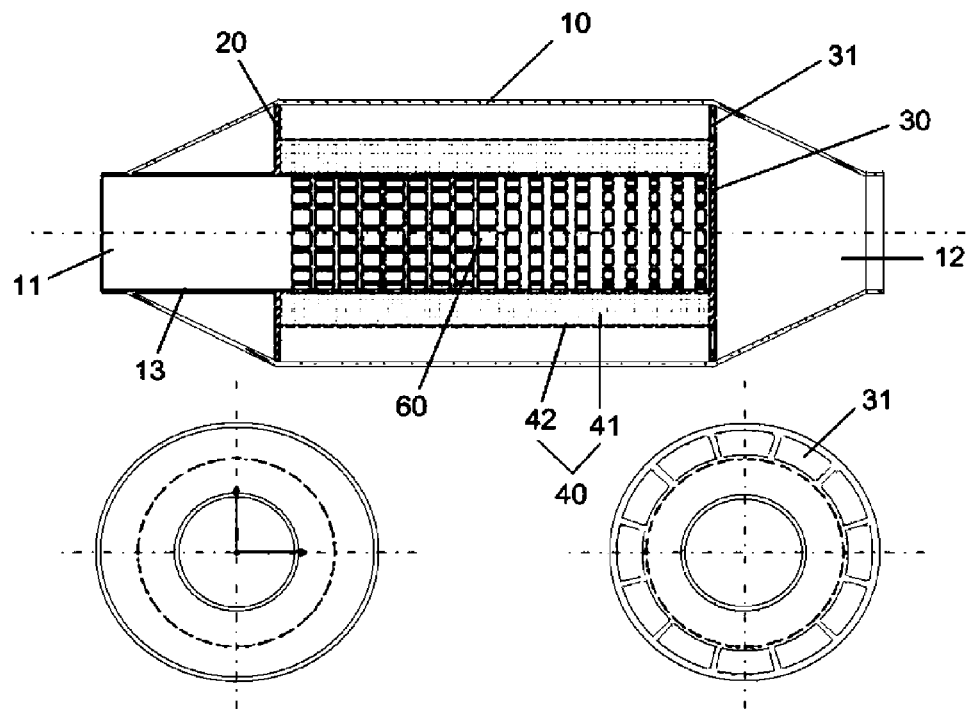
FIG. 9 is a sectional view illustrating a filter device according to an embodiment of the invention where the internal pipe is structured to control the porosity thereof.
Figure 10:
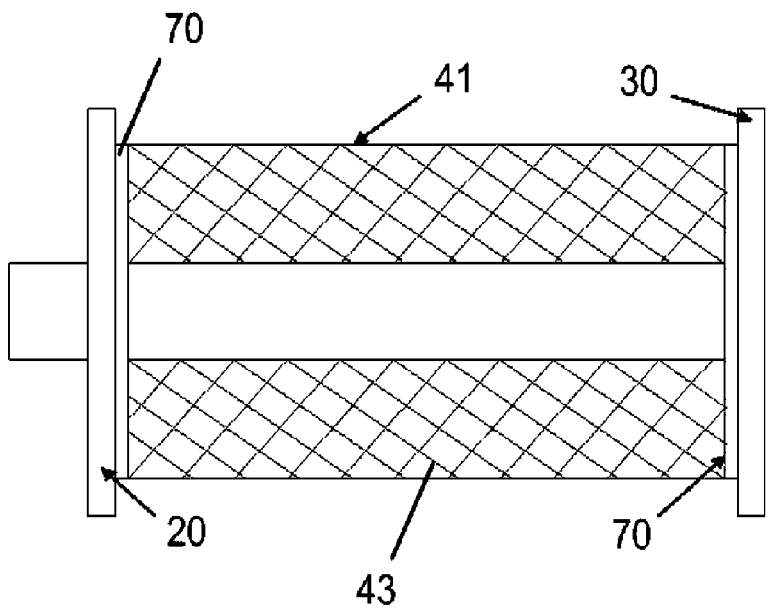
FIG. 10 is a sectional view illustrating a filter device for filtering automobile exhaust gas according to an embodiment of the invention where a sealing mat is mounted.
Figure 11:
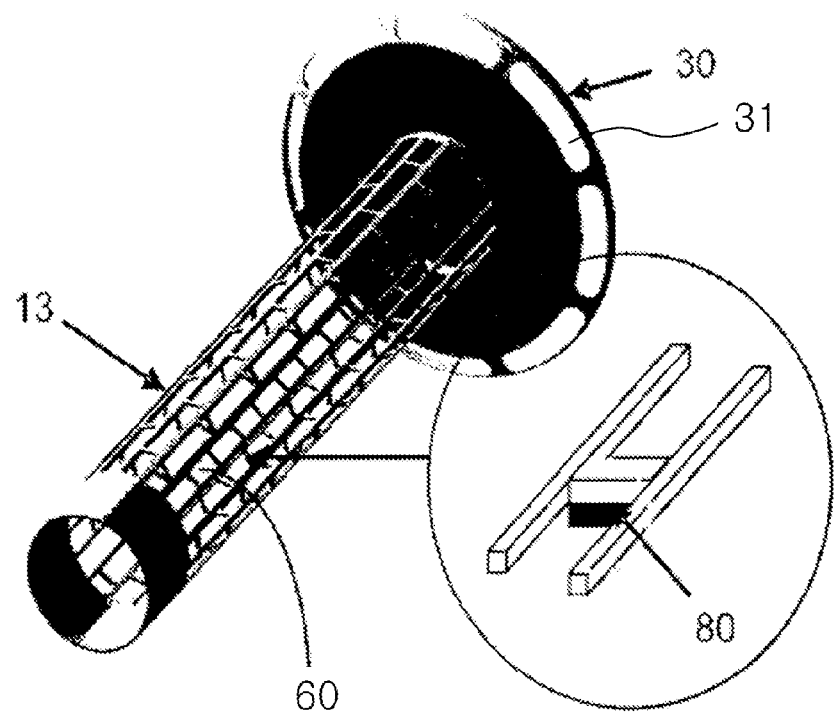
FIG. 11 is a perspective view illustrating the schematic structure of a turbulence generator member that is mounted in a filter device for filtering automobile exhaust gas according to an embodiment of the invention.
Figure 12:
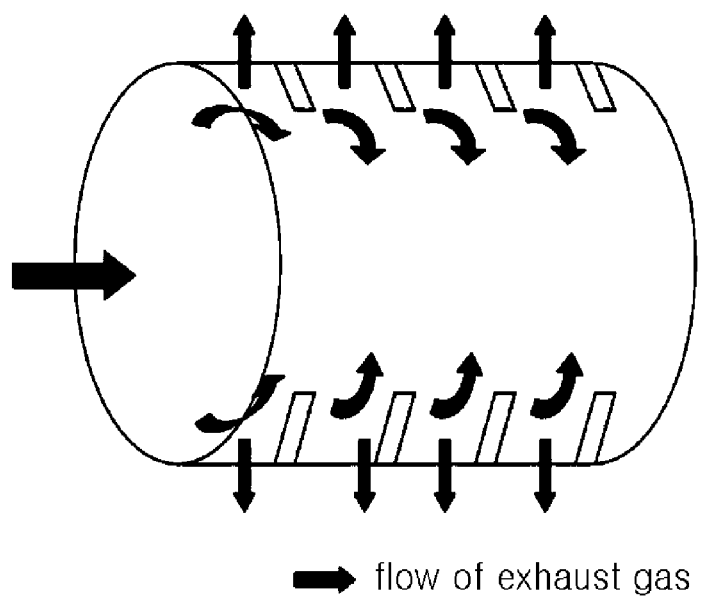
FIG. 12 illustrates the flow of exhaust gas by the turbulence generator member of FIG. 11.
Figure 13:
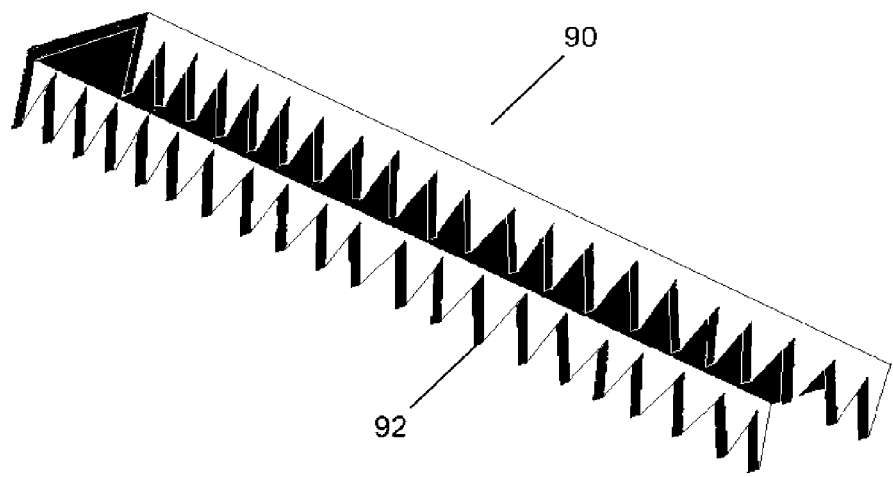
FIG. 13 illustrates a metallic fastener device mounted in a filter device for filtering exhaust gas according to an embodiment of the invention.
Figure 14:
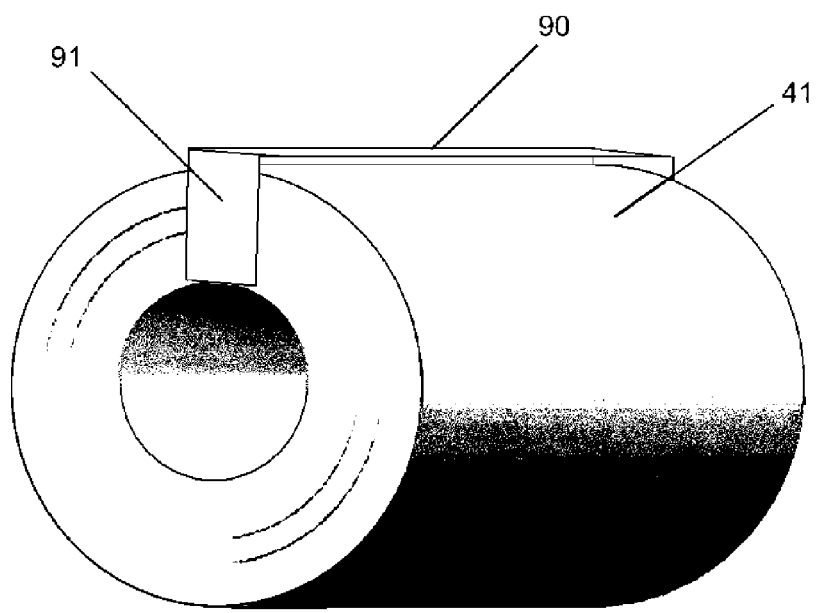
FIG. 14 illustrates a filter device for filtering exhaust gas according to an embodiment of the invention where a metallic foam member is fastened by means of a metallic fastener device.
Figure 15:
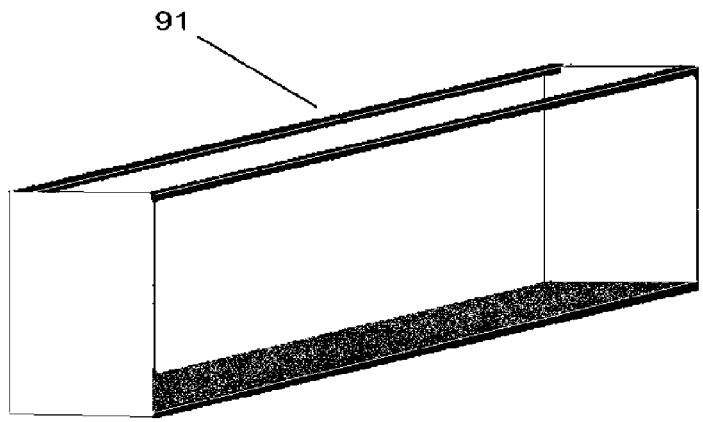
FIG. 15 illustrates a metallic fastener guide that is mounted in a filter device for filtering exhaust gas according to an embodiment of the invention.
Figure 16:
FIG. 16 is a photograph illustrating a method of connecting and winding metallic foams according to an embodiment of the invention where dissimilar or similar metallic foams are connected by means of sewing.
Figure 17:
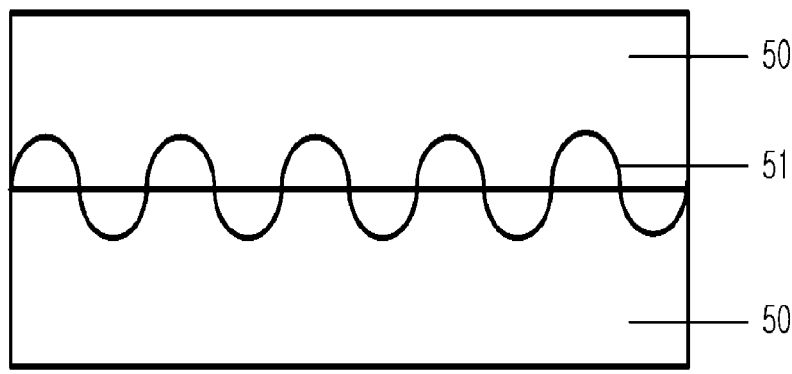
FIG. 17 illustrates a method of connecting and winding metallic foams according to an embodiment of the invention where dissimilar or similar metallic foams are connected by means of sewing.
Figure 18:
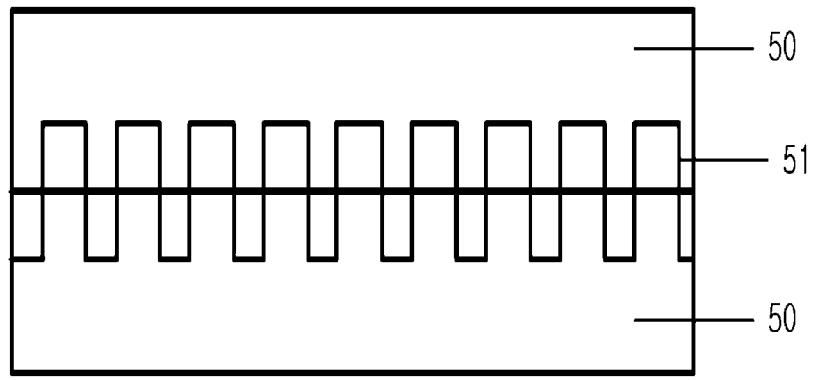
FIG. 18 illustrates a method of connecting and winding metallic foams according to an embodiment of the invention where dissimilar or similar metallic foams are connected by means of sewing.
Figure 19:
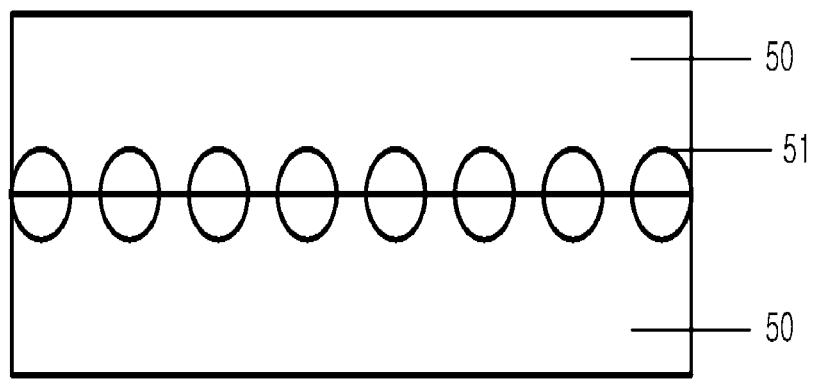
FIG. 19 illustrates a method of connecting and winding metallic foams according to an embodiment of the invention where dissimilar or similar metallic foams are connected by means of sewing.
Figure 20:
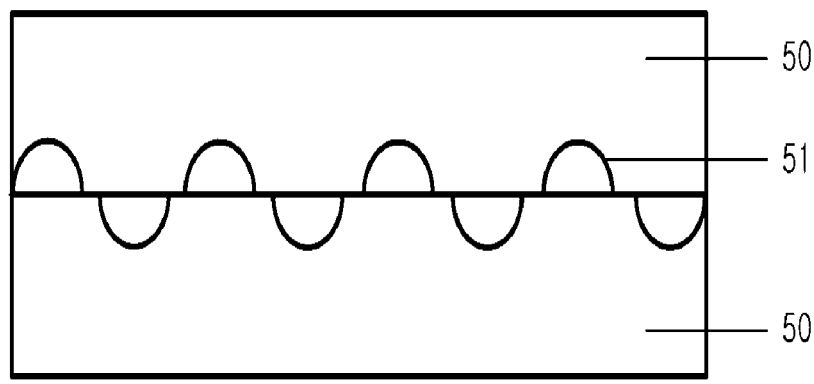
FIG. 20 illustrates a method of connecting and winding metallic foams according to an embodiment of the invention where dissimilar or similar metallic foams are connected by means of sewing.
Figure 21:
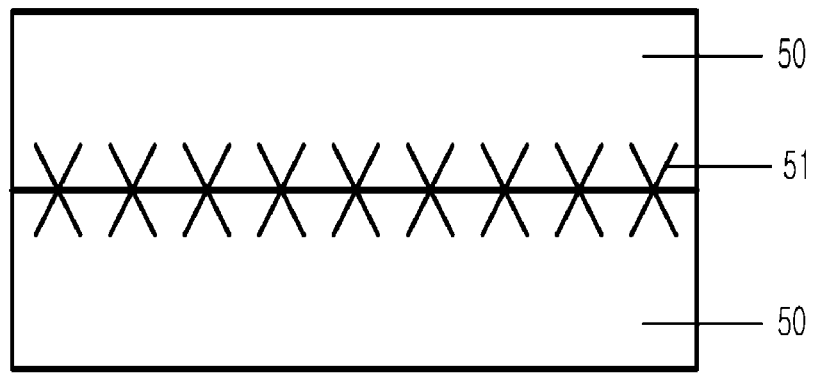
FIG. 21 illustrates a method of connecting and winding metallic foams according to an embodiment of the invention where dissimilar or similar metallic foams are connected by means of sewing.
Figure 22:
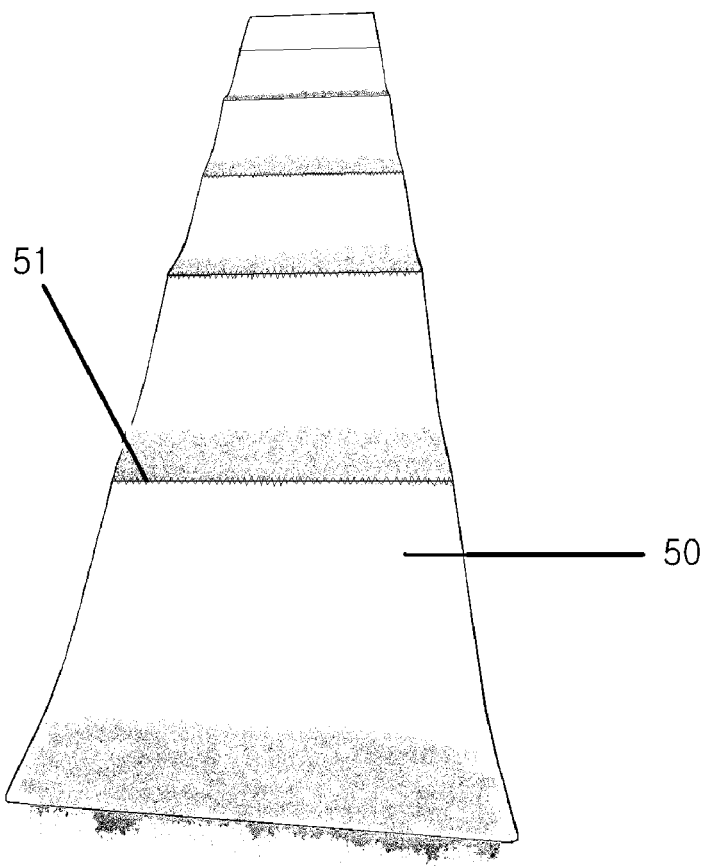
FIG. 22 is a photograph illustrating a plurality of dissimilar or similar metallic foams connected by sewing using a method of connecting metallic foams according to an embodiment of the invention.

FIG. 1 is a sectional view illustrating a filter device according to an embodiment of the invention where a conical member is mounted in an internal pipe. FIG. 2 is a sectional view illustrating a filter device according to an embodiment of the invention where a partition is mounted in the rear end portion of the conical member of the internal pipe. FIG. 3 is a sectional view illustrating a filter device according to the invention where a pyramidal member is mounted in the internal pipe. FIG. 4 is a sectional view illustrating a filter device according to an embodiment of the invention where a partition is mounted in the middle portion of pyramidal members facing each other in the internal pipe. FIG. 5 is a sectional view illustrating a filter device according to an embodiment of the invention where a support distribution member is formed in the front end portion of the conical member. FIG. 6 is a sectional view illustrating a filter device according to an embodiment of the invention where a metallic mat is mounted. FIG. 7 is a sectional view illustrating a filter device according to an embodiment of the invention where the internal pipe is structured in a shrinking-type. FIG. 8 is a sectional view illustrating a filter device according to an embodiment of the invention where the internal pipe is structured in an enlarging-type. FIG. 9 is a sectional view illustrating a filter device according to an embodiment of the invention where the internal pipe is structured to control the porosity thereof. FIG. 10 is a sectional view illustrating a filter device for filtering automobile exhaust gas according to an embodiment of the invention where a sealing mat is mounted. FIG. 11 is a perspective view illustrating the schematic structure of a turbulence generator member that is mounted in a filter device for filtering automobile exhaust gas according to an embodiment of the invention. FIG. 12 illustrates the flow of exhaust gas by the turbulence generator member of FIG. 11. FIG. 13 illustrates a metallic fastener device mounted in a filter device for filtering exhaust gas according to an embodiment of the invention. FIG. 14 illustrates a filter device for filtering exhaust gas according to an embodiment of the invention where a metallic foam member is fastened by means of a metallic fastener device. FIG. 15 illustrates a metallic fastener guide that is mounted in a filter device for filtering exhaust gas according to an embodiment of the invention. FIG. 16 is a photograph illustrating a method of connecting and winding metallic foams according to an embodiment of the invention where dissimilar or similar metallic foams are connected by means of sewing. FIG. 16 illustrates a method of connecting and winding metallic foams according to an embodiment of the invention where dissimilar or similar metallic foams are connected by means of sewing. FIG. 18 illustrates a method of connecting and winding metallic foams according to an embodiment of the invention where dissimilar or similar metallic foams are connected by means of sewing. FIG. 19 illustrates a method of connecting and winding metallic foams according to an embodiment of the invention where dissimilar or similar metallic foams are connected by means of sewing. FIG. 20 illustrates a method of connecting and winding metallic foams according to an embodiment of the invention where dissimilar or similar metallic foams are connected by means of sewing. FIG. 21 illustrates a method of connecting and winding metallic foams according to an embodiment of the invention where dissimilar or similar metallic foams are connected by means of sewing. FIG. 22 is a photograph illustrating a plurality of dissimilar or similar metallic foams connected by sewing using a method of connecting metallic foams according to an embodiment of the invention.

Hereafter, preferred embodiments of the invention will be explained in detail, with reference to the drawings. In the drawings, like references denote like elements.

A filter device 100 for filtering automobile exhaust gas (hereinafter, referred to as a filter device) according to an embodiment of the invention includes a case 10, an inlet port 11, an exhaust port 12, a pipe 13, a conical member 14, a pyramidal member 15, a support distribution member 16, a partition 17, a front support flange 20, a conical lid (not shown in the drawings), a rear support flange 30, a vent hole 31, a filter member 40, a metallic foam filter 41, a metallic mat 42, a jacket 43, a metallic foam meter 50, a string 51, a hole 60, a sealing mat 70, a turbulence generator member 80, a metallic fastener member 90, a metallic fastener guide 91, a tipped end portion 92 and the like.

As illustrated in FIGS. 1 to 22, the filter device 100 includes a case 10, a front support flange 20 mounted inside the care 10, a rear support flange 30 inside the case 10, and a filter member 40 mounted between the front support flange 20 and the rear support flange 30. The case 10 includes an inlet port 11 through which an exhaust gas combusted in an engine flows into an internal porous pipe 13, and an exhaust port 12 through which the exhaust gas is discharged after passing through the internal porous pipe 13 and a filter member 40. The front support flange 20 is mounted inside the case. The front support flange 20 is fixed vertically to the front end portion of the filter member wrapping around the porous pipe 13, thereby holding the porous pipe 13 in place and preventing the filter member from being pushed towards the front end. The rear support flange 30 is mounted inside the case 10. The rear support flange 30 is fixedly fastened vertically to the rear end portion of the filter member wrapping around the porous pipe 13, thereby holding the porous pipe 13 in place and preventing the filter member from being pushed towards the rear end. The filter member 40 is mounted between the front support flange 20 and the rear support flange 30. The filter member 40 includes a metallic foam filter 41 of a laminated type or rolled-up type through which the exhaust gas flown into the porous pipe 13 passes, and a metallic mat 42 or a jacket 43 wrapping around the metallic foam filter 41. The metallic foam filter 41 is formed in the form of a network to preserve the original shape of the metallic foam filter 41 and to provide durability thereto. The porous pipe 13 mounted inside the filter member 40 is formed with a plurality of holes 60 through which the exhaust gas can smoothly flow into the filter member 40 and be discharged. In order not to cause a gradient in the flow rate inside the porous pipe 13, the porous pipe 13 may be structured such that the width thereof decreases gradually towards the rear end portion (shrinking-type), or increase gradually towards the rear end portion (enlarging-type). As an alternative, the porous pipe 13 may be formed such that the holes in the rear end portion are smaller to cause a uniform flow rate even when the flow rate in the rear end portion becomes high by a high pressure due to a smaller flow area (hole-adjusting-type). As another alternative, the porous pipe 13 may be provided with a conical member 14 inserted in the inside space where the holes are formed, thereby enabling to uniformly collect particulate matters inside the pipe. As a further alternative, the porous pipe 13 may be provided with a pyramidal member 14 inserted in the inside space where the holes are formed, thereby enabling to uniformly collect the particulate matters inside the pipe.

Referring to FIGS. 3 to 12, major technical features of the filter device according to an embodiment of the invention will be explained hereafter.

The case 10 is formed with an inlet port 11 through which an exhaust gas combusted in an engine flows into a porous pipe 13, and an exhaust port 12 through which the exhaust gas is discharged after passing through the internal porous pipe 13 and a filter member 40. The porous pipe 13 is formed of a metallic material. The porous pipe 13 is formed with a plurality of polygonal vent holes. Here, a conical lid 21 may be fastened to the upper end portion of the filter assembly, so that the exhaust gas flowing into the inlet port 11 can flow smoothly.

As illustrated in FIGS. 11 and 12, a turbulence generator member 80 is inserted into the inside of the porous pipe 13 and fixed thereto to cause turbulence in the exhaust gas flow and thus decrease the flow rate of the exhaust gas, thereby increasing the stagnant time of the exhaust gas inside the filter. The turbulence generator member 80 is formed in the form of a plate-like thin layer and integrally and vertically fixed to the porous pipe 13. The exhaust gas being flown into the porous pipe 13 is collided to the plate-like thin layer of the turbulence generator member 80 to generate a turbulent current, thereby enabling to slow down the speed of the exhaust gas and thus increase the period of time for which the exhaust gas remains inside the filter.

The front support flange 20 is mounted inside the case. The front support flange 20 is fixed vertically to the front end portion of the filter member wrapping around the porous pipe 13, thereby holding the porous pipe 13 in place and preventing the filter member from being pushed towards the front end. The front support flange 20 is not formed with a vent hole so that the exhaust gas can not flow towards the front support flange.

The rear support flange 30 is mounted inside the case 10. The rear support flange 30 is fixedly fastened vertically to the rear end portion of the filter member wrapping around the porous pipe 13, thereby holding the porous pipe 13 in place and preventing the filter member from being pushed towards the rear end. The rear support flange 30 is formed with a plurality of vent holes 31 through which the exhaust gas passing through the filter member 40 can be discharged.

As illustrated in FIG. 10, a metallic sealing mat 70 is provided between the front support flange 20 and the metallic foam filter 41, and between the rear support flange 30 and the metallic foam filter 41 respectively. The metallic sealing mat 70 is formed of a metallic wire mesh having a thermal expansion coefficient similar to that of the metallic foam filter.

The filter member 40 is mounted between the front support flange 20 and the rear support flange 30. As illustrated in FIGS. 6 and 10, the filter member 40 includes a metallic foam filter 41 of a laminated type or rolled-up type through which the exhaust gas flown into the porous pipe 13 passes, and a metallic mat 42 or a jacket 43 wrapping around the metallic foam filter 41. The metallic foam filter 41 is formed in the form of a network to preserve the original shape of the metallic foam filter 41 and to provide durability thereto. The metallic mat 42 is mounted in the front face and the rear face of the metallic foam filter 41 in such a way to surround both side of the metallic foam filter 41. The metallic foam filter 41 is formed of an alloy of Ni—Cr—Fe. The metallic foam filter 41 has a surface pore of 200 μm to 2500 μm, and a porosity rate of 88%±8%.

As illustrated in FIGS. 16 to 22, the similar or dissimilar metallic foam filters 41 are connected by sewing in one or more forms among a repeated spiral form, a sinuous waveform, a rectangular waveform, a circular form, a semi-circular form, and a X-letter form.

As illustrated in FIGS. 13 to 15, when the metallic foam filter 41 is rolled up, a metallic fastener device 90 and a metallic fastener guide 91 are mounted for the purpose of easy fastening of the filter assembly. The metallic fastener guide 91 wraps around the metallic foam filter 41 and the metallic fastener device 90 holds the metallic fastener guide 91 to thereby minimize deformation of the metallic foam and reduce loss of the metallic foam. The metallic fastener device 90 is used in a single or plural number. The metallic fastener device is formed to have plural point-tipped portions 92 and the size of the point-tipped portion 92 may vary with characteristic of the foam.

The porous pipe 13 mounted inside the filter member 40 is formed with a plurality of holes 60 through which the exhaust gas can smoothly flow into the filter member 40 and be discharged. In order not to cause a gradient in the flow rate inside the porous pipe 13, the porous pipe 13 may be structured such that the width thereof decreases gradually towards the rear end portion (shrinking-type, FIG. 7), or increase gradually towards the rear end portion (enlarging-type, FIG. 8). As an alternative, the porous pipe 13 may be formed such that the holes in the rear end portion are smaller to cause a uniform flow rate even when the flow rate in the rear end portion becomes high by a high pressure due to a smaller flow area (hole-adjusting-type, FIG. 9). As another alternative, the porous pipe 13 may be provided with a conical member 14 inserted in the inside space where a plurality of holes are formed, thereby enabling to uniformly collect particulate matters inside the pipe (FIG. 1). As a further alternative, the porous pipe 13 may be provided with a pyramidal member 14 inserted in the inside space where a plurality of holes 60 are formed, thereby enabling to uniformly collect the particulate matters inside the pipe (FIG. 3).

As illustrated in FIG. 5, a support distribution member 16 is formed in the front portion of the conical member 14 mounted inside the porous pipe 13, thereby flowing the exhaust gas into the porous pipe with a uniform flow rate.

In addition, a partition 17 may be inserted into the rear end portion of the conical member 14 mounted internally in the middle of the porous pipe, or a partition 17 may be inserted into an intermediate portion formed facing the back of the pyramidal member. The filter member 40 can be divided into a plurality of filter regions by means of a partition, each of which is treated with various catalysts and then mounted inside a single filter member 40, thereby enabling to remove various gases from the exhaust gas.

In other hand, according to another embodiment of the invention, the porous pipe 13 mounted inside the filter member 40 is formed with a plurality of holes 60 so that the exhaust gas smoothly flows into and passes through the filter member. In addition, the porous pipe 13 may be formed in such a manner that the holes formed in the rear end portion thereof are smaller to thereby obtain a uniform flow rate even when the flow area of the rear end portion becomes smaller and thus increases the pressure, i.e., the flow speed therein. Further, the size of the holes may be different gradually towards the right side from the left side of the porous pipe 13, i.e., towards the side of the exhaust port from the inlet port, in a way to intentionally create a back pressure. That is, the size of the holes becomes smaller so that the flow rate can be uniformly distributed even if the flow area of the rear end portion becomes smaller and thus increases the pressure, i.e., the flow speed therein.

INDUSTRIAL APPLICABILITY

As described above, according to the present invention, a conical or pyramidal member is mounted inside a porous pipe through which the exhaust gas flows, thereby improving the flow of the exhaust gas and not creating a gradient in the flow rate to enable to uniformly collect particulate matter inside the porous pipe. A metallic foam filter mounted inside the filter member is wrapped around with a metallic mat to enable to preserve the original shape of the metallic foam filter to thereby improve the durability of the filter device. The filter member is divided into a plurality of filter regions by means of a partition, each of which is treated with various catalysts and then mounted inside a single filter member to thereby remove various gases from the exhaust gas, and the metallic foam has various catalysts to enable to produce a variety of post-treatment devices for exhaust gas including DOC, DeNOx, DPF, SCR, LNT, Soot Capacitor, a catalyst filter of EGR, an evaporator and an electrostatic filter. A support distribution member is disposed in the front portion of the conical member mounted inside the porous pipe, thereby allowing the exhaust gas to flow into the porous pipe with a uniform flow rate. The porous pipe is structured such that the width thereof decreases gradually towards the rear end portion, or increase gradually towards the rear end portion, thereby allowing particulate matter to be uniformly collected inside the porous pipe. The porous pipe is formed such that the holes in the rear end portion are smaller to cause a uniform flow rate even when the flow rate in the rear end portion becomes high by a high pressure due to a smaller flow area. A conical lid is fastened to the upper end portion of the filter assembly so that the exhaust gas entering the inlet port can flow smoothly. A sealing mat is disposed between the front support flange and the metallic foam filter and between the rear support flange and the metallic foam filter, and the sealing mat is formed of a metallic wire mesh having a thermal expansion coefficient similar to that of the metallic foam, thereby enabling application of a welding process, effectively preventing leakage of the exhaust gas due to a long term service of the fume reduction device, i.e., DPF (Diesel Particulate Filter) to improve the performance of the filter device, and maintaining the flow passage for a long period of time due to the high durability thereof. A turbulence generator member is mounted into the inside of the porous pipe having a polygonal air passageway to create a turbulence in the exhaust gas and thus obtain a uniform flow distribution, and simultaneously to decrease the flow rate of the exhaust gas and increase the stagnant time of the exhaust gas inside the filter, thereby increasing the probability of contacting the metallic foam filter with particulate matter to increase the efficiency of collection thereof. A metallic fastener device is used for fastening a rolled-up type metallic foam filter to thereby provide easy fastening of the filter assembly, minimize deformation of the metallic foam, and reduce loss of the metallic foam when the metallic foam filter is rolled up. A similar or dissimilar metallic foam filters are connected by sewing in one or more forms among a repeated spiral form, a sinuous waveform, a rectangular waveform, a circular form, a semi-circular form, and a X-letter form, thereby allowing the user to connect plural metallic foams in a variety of shapes, depending upon applications thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A filter device for filtering automobile exhaust gas, the filter device comprising:
   a case including an inlet port through which exhaust gas combusted in an engine flows into a porous pipe and an exhaust port through which the exhaust gas is discharged after passing through the porous pipe and a filter member, the filter member including a metallic foam filter of a laminated type or rolled-up type through which the exhaust gas flown into the porous pipe passes;
   a front support flange mounted inside the case, the front support flange being fixed vertically to a front end portion of the filter member wrapping around the porous pipe, thereby holding the porous pipe in place and preventing the filter member from being pushed towards the front end;
   a rear support flange mounted inside the case, the rear support flange being fixedly fastened vertically to a rear end portion of the filter member wrapping around the porous pipe, thereby holding the porous pipe in place and preventing the filter member from being pushed towards the rear end wherein the filter member is mounted between the front support flange and the rear support flange;
   a metallic mat or a jacket wrapping around the metallic foam filter, the metallic foam filter being formed in the form of a network to preserve the original shape of the metallic foam filter and to provide durability thereto,
   a metallic fastener guide wrapping around the metallic foam filter to provide easy fastening of the filter member when the metallic foam filter is rolled up; and
   a metallic fastener device holding the metallic fastener guide to minimize deformation of the metallic foam filter and to reduce loss of the metallic foam filter,
   wherein the porous pipe mounted inside the filter member is formed with a plurality of holes such that the exhaust gas smoothly flows into the filter member and is discharged through the plurality of holes, the porous pipe being structured such that the width thereof decreases gradually towards a rear end portion of the porous pipe or increases gradually towards a rear end portion of the porous pipe, or such that the plurality of holes in the rear end portion of the porous pipe are smaller to cause a uniform flow rate even when the flow rate in the rear end portion of the porous pipe becomes high by high pressure due to a smaller flow area, or such that a conical member is inserted in the inside space of the porous pipe where the plurality of holes are formed, thereby enabling to uniformly collect particulate matters inside the pipe, or such that a pyramidal member is inserted in the inside space of the porous pipe where the plurality of holes are formed, thereby enabling to uniformly collect the particulate matters inside the pipe, so that a gradient in the flow rate inside the porous pipe does not occur,
   wherein the front support flange is not formed with a vent hole, and the rear support flange is formed with a plurality of vent holes through which the exhaust gas passing through the filter member is discharged.

2. The filter device according to claim 1, further comprising a support distribution member disposed in a front portion of the conical member mounted inside the porous pipe, thereby allowing the exhaust gas to flow into the porous pipe with a uniform flow rate.

3. The filter device according to claim 1, further comprising a partition inserted into a rear end portion of the conical member mounted internally in a middle portion of the porous pipe, or a partition inserted into an intermediate portion formed facing a back of the pyramidal member.

4. The filter device according to claim 1, wherein the filter member is divided into a plurality of filter regions by means of a partition, each of which is treated with various catalysts and then mounted inside a single filter member to thereby remove various gases from the exhaust gas, and the metallic foam filter has various catalysts for producing a variety of post-treatment devices for exhaust gas including DOC, DeNOx, DPF, SCR, LNT, Soot Capacitor, a catalyst filter of EGR, an evaporator and an electrostatic filter.

5. The filter device according to claim 1, further comprising a sealing mat disposed between the front support flange and the metallic foam filter and between the rear support flange and the metallic foam filter, the sealing mat being formed of a metallic wire mesh having a thermal expansion coefficient similar to a thermal expansion coefficient of the metallic foam filter.

6. The filter device according to claim 1, further comprising a turbulence generator member inserted into the inside of the porous pipe and fixed thereto to cause turbulence in the exhaust gas flow, and thus decreasing the flow rate of the exhaust gas, thereby increasing the stagnant time of the exhaust gas inside the filter device.

7. The filter device according to claim 6, wherein the turbulence generator member is formed in the form of a plate-like thin layer and integrally and vertically fixed to the porous pipe such that the exhaust gas flown into the porous pipe collides with the plate-like thin layer of the turbulence generator member to generate a turbulent current, thereby slowing down the speed of the exhaust gas, thus increasing a period of time for which the exhaust gas remains inside the filter device.

8. The filter device according to claim 1, wherein:
   the metallic fastener device includes a single metallic fastener device or a plurality of metallic fastener devices;
   the metallic fastener device is formed to have a plurality of point-tipped portions; and
   a size of each of the plurality of point-tipped portions varies with characteristic of the metallic foam filter.

9. The filter device according to claim 1, wherein similar or dissimilar metallic foam filters are connected by sewing in one or more forms among a repeated spiral form, a sinuous waveform, a rectangular waveform, a circular form, a semi-circular form, and a X-letter form.

10. The filter device according to claim 1, wherein the plurality of vent holes are formed at a peripheral portion of the rear support flange.

11. The filter device according to claim 10, wherein the plurality of vent holes are formed such that only the exhaust gas that passes through the filter member, and thus, not in the porous pipe is discharged through the plurality of vent holes.

12. The filter device according to claim 10, wherein the porous pipe is connected to a central portion of the rear support flange.

13. The filter device according to claim 12, wherein the filter member is connected to an intermediate portion of the rear support flange, the intermediate portion positioned between the central portion and peripheral portion of the rear support flange.

14. The filter device according to claim 1, wherein an outer surface of the rear support flange is in contact with an inner surface of the case.

15. The filter device according to claim 14, wherein an outer surface of the front support flange is in contact with the inner surface of the case.

* * * * *